United States Patent
George

(10) Patent No.: US 7,942,311 B2
(45) Date of Patent: May 17, 2011

(54) METHOD FOR SEQUENCING FLAVORS WITH AN AUDITORY PHRASE

(75) Inventor: Eapen George, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 615 days.

(21) Appl. No.: 11/957,209

(22) Filed: Dec. 14, 2007

(65) Prior Publication Data

US 2009/0152340 A1 Jun. 18, 2009

(51) Int. Cl.
G06F 17/00 (2006.01)

(52) U.S. Cl. .................... 235/375; 235/462.01

(58) Field of Classification Search .......... 235/487, 235/375, 454, 462.01
See application file for complete search history.

(56) References Cited

U.S. PATENT DOCUMENTS

| | | | |
|---|---|---|---|
| 4,640,842 A | 2/1987 | May | |
| 4,960,602 A | 10/1990 | Talkington et al. | |
| 5,894,119 A * | 4/1999 | Tognazzini | 235/375 |
| 5,942,272 A | 8/1999 | Kaiser | |
| 5,992,752 A * | 11/1999 | Wilz et al. | 235/472.01 |
| 6,057,501 A | 5/2000 | Hale | |
| 6,152,369 A * | 11/2000 | Wilz et al. | 235/462.01 |
| 6,338,434 B1 * | 1/2002 | Wilz et al. | 235/462.01 |
| 6,425,525 B1 * | 7/2002 | Swaminathan et al. | 235/385 |
| 6,464,139 B1 * | 10/2002 | Wilz et al. | 235/462.01 |
| 6,505,776 B1 * | 1/2003 | Wilz et al. | 235/462.01 |
| 6,572,020 B2 * | 6/2003 | Barkan | 235/472.03 |
| 6,622,919 B1 * | 9/2003 | Wilz et al. | 235/472.01 |
| 6,705,872 B2 | 3/2004 | Pearson et al. | |
| 7,253,919 B2 * | 8/2007 | Hull et al. | 358/1.18 |
| 7,337,968 B2 * | 3/2008 | Wilz et al. | 235/462.01 |
| 7,367,514 B2 * | 5/2008 | Soule et al. | 235/494 |
| 7,624,916 B2 * | 12/2009 | Sato et al. | 235/375 |
| 2002/0066782 A1 * | 6/2002 | Swaminathan et al. | 235/375 |
| 2003/0037075 A1 | 2/2003 | Hannigan et al. | |
| 2003/0078838 A1 | 4/2003 | Szmanda | |
| 2003/0173405 A1 * | 9/2003 | Wilz et al. | 235/462.01 |
| 2003/0207722 A1 | 11/2003 | Hess et al. | |
| 2005/0003056 A1 | 1/2005 | Romanach et al. | |
| 2005/0010927 A1 | 1/2005 | Stern et al. | |
| 2005/0024682 A1 * | 2/2005 | Hull et al. | 358/1.18 |
| 2005/0154636 A1 | 7/2005 | Hildinger et al. | |
| 2005/0236483 A1 * | 10/2005 | Wilz et al. | 235/462.01 |
| 2006/0230910 A1 | 10/2006 | Song et al. | |

* cited by examiner

*Primary Examiner* — Daniel A Hess
*Assistant Examiner* — Paultep Savusdiphol
(74) *Attorney, Agent, or Firm* — Colin P. Cahoon; Celina M. Orr; Carstens & Cahoon, LLP

(57) ABSTRACT

A method for linking tasting a food product with listening to an auditory phrase. The method involves identifying sequenced flavor notes in a food product and developing an auditory or musical phrase that represents or artistically relates to the tasting experience of the flavor notes. The auditory phrase is played and listened to concurrently with tasting the food product, thus producing a combined sensory experience.

22 Claims, 4 Drawing Sheets

METHOD FOR SEQUENCING FLAVORS WITH AN AUDITORY PHRASE

BACKGROUND OF THE INVENTION

1. Technical Field

The present invention relates to a method for developing a food product having a plurality of flavor notes and sequencing these flavor notes with an auditory phrase, thus combining a tasting and musical experience. The method uses foods, such as snack foods, that have been prepared to deliver more than one taste sensation during consumption. These taste sensations can vary in intensity, duration, and initial perception, such that they can be detected as a plurality of what Applicant refers to as different "flavor notes." These flavor notes can, in turn, be sequenced with an artistically developed auditory or musical phrase, thereby providing a combined experience of tasting and listening during the process of consuming the food product.

2. Description of Related Art

Flavor, aroma, and texture are the main sensory properties that consumers perceive and evaluate with regard to the selection, acceptance and ingestion of food. Specific aromas, fragrances and formulations are commonly designed and implemented in various foods and perfumes. A food flavor is derived from both the taste and aroma or smell of a food. Typically a skilled flavorist, chemist, perfumist or fragrance formulator will experiment with various oils, extracts, and synthetic materials to achieve a desired flavor, aroma, or fragrance. Various techniques for manipulating the texture of a food are also known in the art.

U.S. Pat. No. 4,640,842, a patent for an internally flavored hull cereal grain, discloses that those skilled in the art can use available reference books that compile suggested acceptable use levels for flavorants in foodstuffs. Similarly, U.S. Pat. No. 5,942,272, a patent for an odorant composition, also discloses a reference book that contains a broad range of known odorants or odorant mixtures that can be used by a skilled perfumer. With the aid of such references, flavorists and perfumists alike use their creative abilities to develop flavors and aromas that consumers will hopefully demand.

Flavors and aromas of a food, along with the texture and mouth feel of the food, combine to provide a tasting experience when a food product is consumed. Individual components of the food product, including individual component flavorants that may be added, each can provide a distinct tasting experience in intensity, duration, and perception. Applicant refers to these individual tasting experiences related to a specific food component as a "flavor note." A flavor note is thus a discernable part of a tasting experience made up of the perceived flavor, aroma, and texture of the moment. Each flavor note can be characterized in a number of different respects by analogy to music. By way of example, volatile compounds, such as volatile oils used to flavor foods, are quickly recognized in the nose but disperse relatively quickly as well. This provides a tasting experience that is initially quick, intense, and then short-lived. It can be said that such tasting experience relates to a flavor note that is a high and short note. In contrast, the flavor produced by coconut or cheese lingers much longer than a volatile oil compound, thus providing what is analogous to a base note of long duration. Ginger can be considered a transition flavor that provides a clear demarcation between one flavor and another, or a transition note. Each one of these different components has a unique start, a unique middle, and a unique finish to the flavor/aroma, all varying in intensity and duration. Some flavors are perceived much quicker than others, thus giving the impression when eating a food compound that the flavors are sequenced. The texture component of a flavor note can also be analogized to music, where a crunchy bite might be reminiscent of a percussive beat, while a smoother texture might be reminiscent of a sustained melodic phrase.

These characteristics of food flavors and aromas have been long recognized, but have never been utilized to expand a tasting experience beyond one of flavor, aroma, and texture. Music, such as can be expressed in an auditory phrase, is a powerful part of a human's sensory experience, triggering emotions, feelings, and the recall of memories. Yet, no effort has been made to correlate and link a tasting experience with a relevant musical sequence, such that the flavor notes of a food product complement the musical aspects of an auditory phrase. Consequently, a need exists for sequencing the flavor notes of a food with a corresponding auditory experience.

SUMMARY OF THE INVENTION

The present invention is directed toward a method for combining a tasting experience with a musical experience. The invention involves developing a food product having a plurality of flavor notes varying in intensity, duration, and initial perception. Developing such a food product provides for a tasting experience when eating the food product comprising a sequence of flavor notes. These flavor notes are identified and, through artistic interpretation, an auditory/musical phrase is developed that is analogous to and complements the sequencing of the flavor notes of the food product. This auditory phrase, which is typically a matter of several seconds long, is played during the tasting of the food product. By starting the auditory phrase at approximately the same time that the food product is placed in the consumer's mouth for consumption, the musical sequence of the auditory phrase corresponds to the sequence of the flavor notes that are perceived by the consumer.

Applicant's invention correlates and links a tasting experience with a relevant musical sequence, such that the flavor notes of a food product complement the musical aspects of an auditory phrase, and vice versa. Thus, Applicant's invention is a powerful combination of both the tasting experience of a food and the listening experience of a music, combined in a single sensory experience.

BRIEF DESCRIPTION OF THE DRAWINGS

The novel features believed characteristic of the invention are set forth in the appended claims. The invention itself, however, as well as preferred modes of use, further objectives, and advantages thereof, will be best understood by reference to the following detailed description of illustrative embodiments when read in conjunction with the accompanying drawings, wherein:

DETAILED DESCRIPTION

Figure 1:
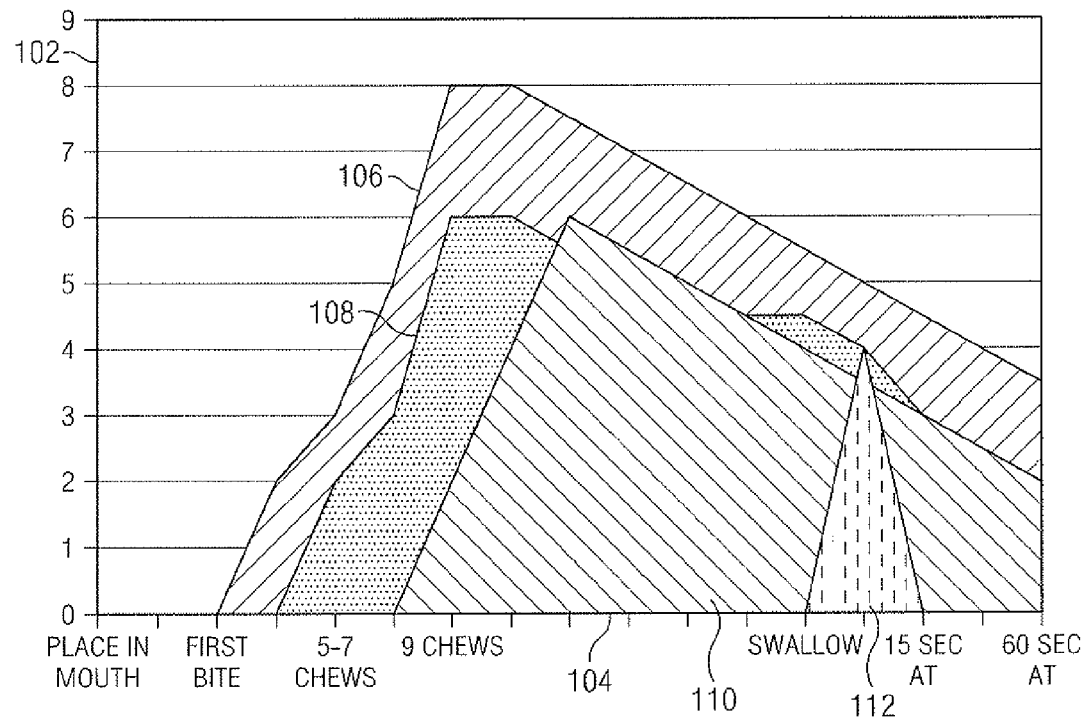
FIG. 1 is a representation of a consumer's taste perception of flavor notes relating to a salsa verde flavored corn chip.

Applicant's invention involves linking tasting a food product with an artistically matched auditory/musical phrase.

When Applicant refers to the term "auditory phrase," this term means an auditory event of a defined length, having musical qualities. In other words, an auditory phrase as defined by Applicant would not include the mere recitation of words or a single pitch tone. Instead, an auditory phrase is intended to define a musical interlude of a short duration, preferably between 5 and 60 seconds, more preferably between 5 and 25 seconds, and most preferably about 15 seconds. Further, as will be explained in more detail below, this musical interlude is not randomly selected but, rather, is intended to artistically match the tasting experience for a particular food.

The first step in Applicant's method involves developing a food product having a plurality of flavor notes varying in intensity, duration, and initial perception. Developing this food product is accomplished by means known in the art, such as adding flavored oils to a snack chip along with other seasonings. The overall taste experience when eating the snack chip includes the flavor (taste), aroma (smell), and texture (mouth feel), which are referred to in combination as "flavor notes," provided by the base food material as well as those flavor notes provided by added flavor oils and/or other seasonings. By analogy to music, these flavor notes are played out in a consumer's mouth from before taking a first bite of the food product through the finish or when the last flavor note is perceived. There is an initial perception as the more volatile compounds are sensed, which is typically aromatic and short lived. This initial perception may occur even before the first bite when the consumer smells the product as it is being placed in the mouth. After the initial perception, other flavor notes can be perceived in succession, again of different durations and intensities. Eventually, the tasting experience ends with what is commonly referred to as a "finish." This finish can be prolonged or can quickly tail off such that the consumer no longer senses any flavor notes.

Using the musical analogy, it is easy to understand that consuming different foods can provide a wide and contrasting taste experience as the plurality of flavor notes are perceived in sequence. However, for any individual food product, this flavor note sequence is typically consistent and reproducible. Consequently, if a consumer samples a specific brand of potato chip, for example, the flavor note sequence will be perceived by that consumer in the same way if the same product is sampled again at some later time.

It is common to attempt to express the sensation from such a flavor note sequence with words. For example, a certain food may be described as initially bitter and crunchy, followed by a fruity and chewy phase, and then having a lasting smooth but peppery finish. Applicant's invention attempts a different expression of the same experience using music. This requires an artistic interpretation of the same initially bitter flavor, followed by a fruity middle, and a lasting peppery finish. This artistic interpretation is referred to by Applicant as composing or compiling an auditory phrase having a plurality of components, wherein at least one component is associated with each of the flavor notes identified in the food product that is being tasted. Consequently, selecting a musical phrase at random does not meet the requirements of Applicant's invention. Rather, the auditory phrase must have an artistic yet relevant coincidence with the flavor notes of the food product. For example, a high note in short duration with and underlying percussive beat, followed by a major chord with some melodic variation, and finally followed by a fading bass line might be an example of an auditory phrase artistically crafted to relate to the food product having a bitter start, fruity middle, and peppery finish. The meter and duration of this auditory phrase in the example just given would match the meter and duration of each of the individual food notes, such that the major chord and melodic variations start at the approximate time that the consumer perceives the fruity middle portion of the tasting experience and the bass line becomes audible at the approximate time that the peppery note is perceived while tasting. Consequently, this auditory phrase must be played and listened to such that it starts at the approximate time that the food product is placed in the consumer's mouth for tasting. By doing so, the auditory phrase is matched with the sequence of flavor notes of the food product.

FIG. 1 is an illustration of the sequencing of flavor notes focusing only on the aspect of the perception of taste. The data on FIG. 1 was accumulated from panel testing of a salsa verde flavored corn chip. The vertical axis 102 is labeled and indexed on a fifteen point intensity scale reflecting the average intensity of the particular flavor as perceived by the panel. The horizontal axis 104 is event-based and progresses in time from left to right. For example, the axis 104 is labeled with a starting point of when the chip is placed in the tester's mouth, records the perception of a cilantro, tomatillo, lime flavor 106 at the first bite, tracks perceptions at five to seven chews, nine chews, swallow, and finishes the chart at a fifteen second aftertaste mark and a sixty second aftertaste mark. The fifteen second and sixty second indices are referenced from the act of placing a chip in the tester's mouth as starting the time clock.

The chart shown in FIG. 1 focuses on four flavor notes 106, 108, 110, 112. Applicant's preferred embodiment focuses on four flavor notes as well, although any number of flavor notes that are capable of being perceived by the consumer can be used with Applicant's invention. Again, solely on the basis of taste, and ignoring for a moment the contribution to a flavor note of aroma and texture, one can see by looking at FIG. 1 that the first perception is of the cilantro, tomatillo, lime flavor 106 coincident with the first bite. The next perceived flavor is a spice flavor 108, which is perceived by the tester shortly thereafter, although at a lower intensity. The middle flavor in the flavor sequence is the corn flavor note 110. This flavor note is followed by what is referred to as a heat burn flavor note 112 induced, for example, by a Serrano chili flavor.

Figure 2:
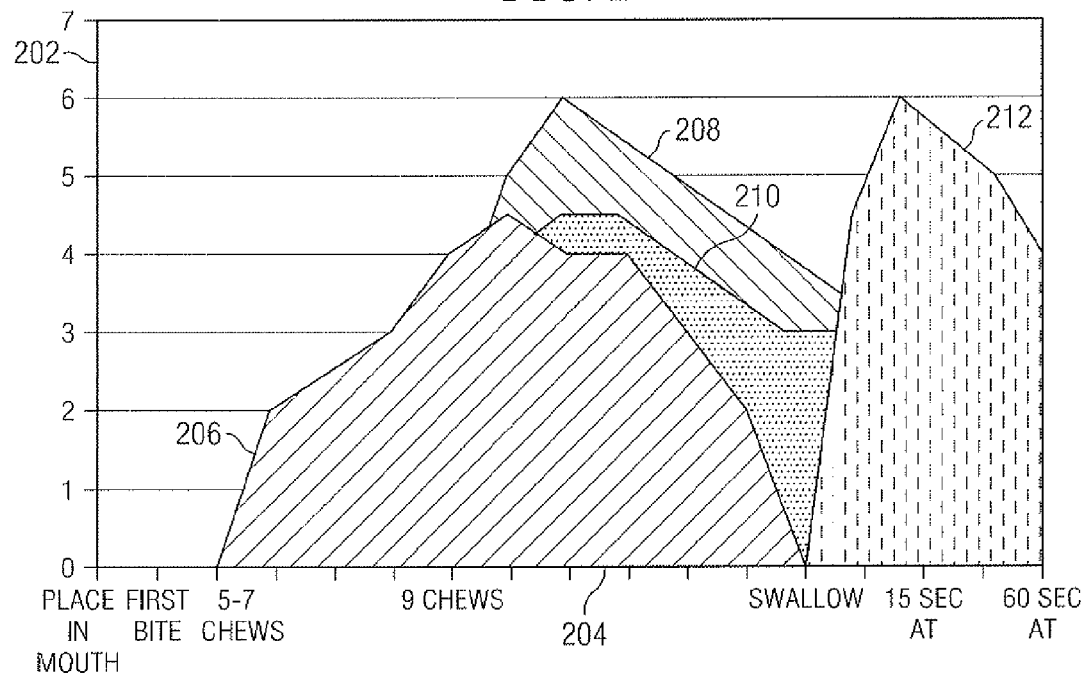
FIG. 2 is a representation of a consumer's taste perception of flavor notes relating to a curry flavored corn chip.

FIG. 2 is a similar representation but relates to a curry flavored corn chip. Again, the vertical axis 202 is based on a fifteen point intensity scale, while the horizontal axis 204 is event-based. The curry flavor chip gave its first flavor note (again irrespective of aroma) as a curry mint note 206 at about five to seven chews. This flavor note is followed by the corn note 208 and shortly thereafter by a middle note of yogurt 210. With the curry chip, the heat burn note 212 occurs near the swallowing point and dominates the finish out to the recorded sixty second mark.

Figure 3:
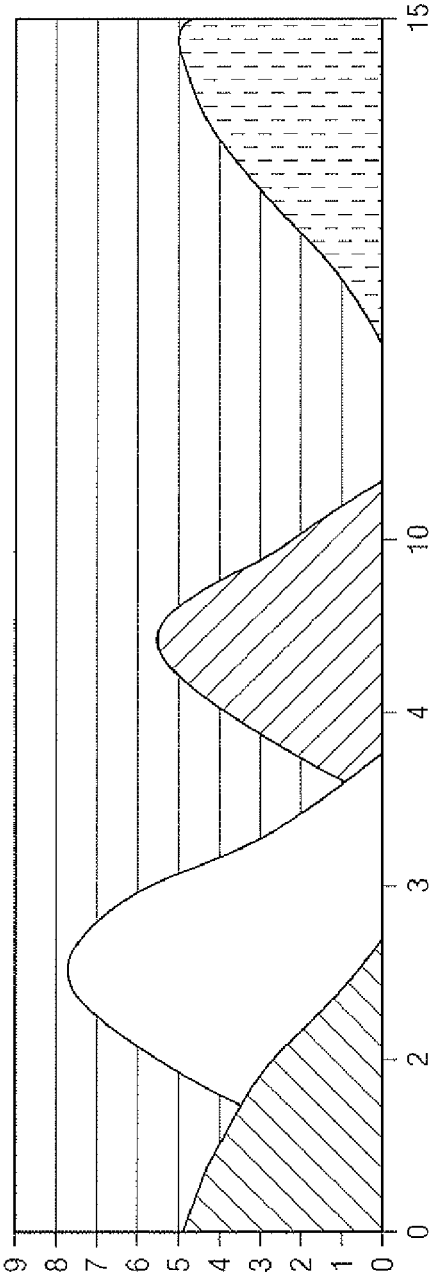
FIG. 3 is a representation of a consumer's overall perception of the flavor notes of a salsa verde flavored chip.

As noted previously, FIGS. 1 and 2 did not take into account the perception of aroma or texture as a part of the sequencing of flavor notes. FIG. 3 is an illustration of a consumer's overall perception of various flavor notes (taste, aroma, and texture combined) as they relate to the salsa verde chip referenced in FIG. 1. The vertical axis 302 is again an intensity scale, while the horizontal axis 304 is a time scale in seconds. Because of the high volatility and low molecular weight of the cilantro flavoring 306, it is perceived by the consumer prior to even placing the chip in the consumer's mouth. This perception of the cilantro 306 is quickly followed by the perception of lime 308, again because of the high volatility and low molecular weight of this flavor. The middle note 310 of tomatillo is perceived sometime after approximately three seconds and fades sometime after the ten second mark. Finally, the Serrano chili flavor 312 is the finish flavor lasting well beyond fifteen seconds.

Figure 4:
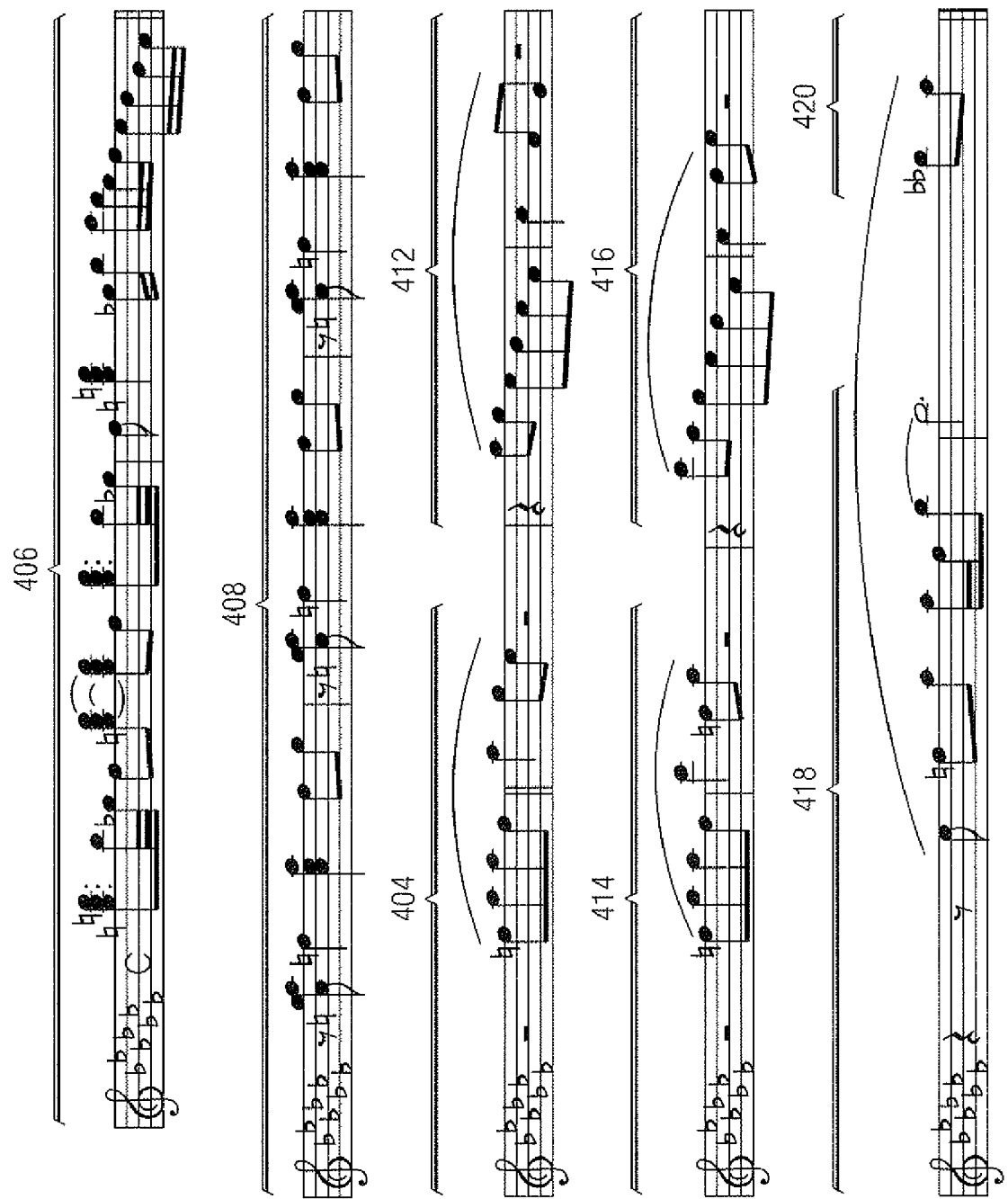
FIG. 4 is an illustration relating to an auditory phrase associated with a salsa flavored corn chip.

FIG. 4 represents an example of an auditory phrase composed to match the salsa verde note sequencing illustrated in FIG. 3. This particular auditory phrase or piece is intended to be played at a tempo of 128 beats per minute. The auditory phrase illustrated by FIG. 4 can be played by, for example, a piano or a full band, or any arrangement of musical instruments that lend themselves to providing the auditory experience desired. The first section 406 is a piano intro and begins upon the consumer's perception of the cilantro flavoring. During the next section 408 the full band enters. This full band section 408 occurs at approximately the time that the consumer perceives the tomatillo and lime flavors, or starting about 4 seconds from the beginning of the piece. Next comes a first horn melody section 404 starting at approximately ten seconds into the piece, followed by a second melody section 412, which starts at about 13 seconds into the piece. This second melody section 412, along with a third section 414 and a fourth section 416, correspond to the sensation of the heat burn imparted by the Serrano chili. The third section 414 starts at about 17 seconds into the piece, and the fourth section 416 starts at about 21 seconds into the piece. This is followed by a fifth section 418, which starts at about 25 seconds into the piece. Finally, the entire auditory phrase fades out 420 after a total elapsed time of about 28 seconds.

The auditory phrase shown as an example in FIG. 4 is just one of any infinite number of auditory phrases that might be matched to the sensation of consuming, in this example, a salsa-flavored corn chip. As previously described, the consumer can eat a single salsa-flavored tortilla chip while listening to an artistic presentation of the auditory phrase presented by FIG. 4, thus perceiving different auditory experiences in sequence with the flavor notes perceived in the consumer's mouth. The example presented by FIG. 4 is in no means limiting and is only provided as a single example of an auditory phrase specifically composed to match a specific food product having a plurality of flavor notes. Thus, this auditory phrase has been matched with the sequence of flavor notes of the food product that are experienced when the food product is consumed.

Figure 5:
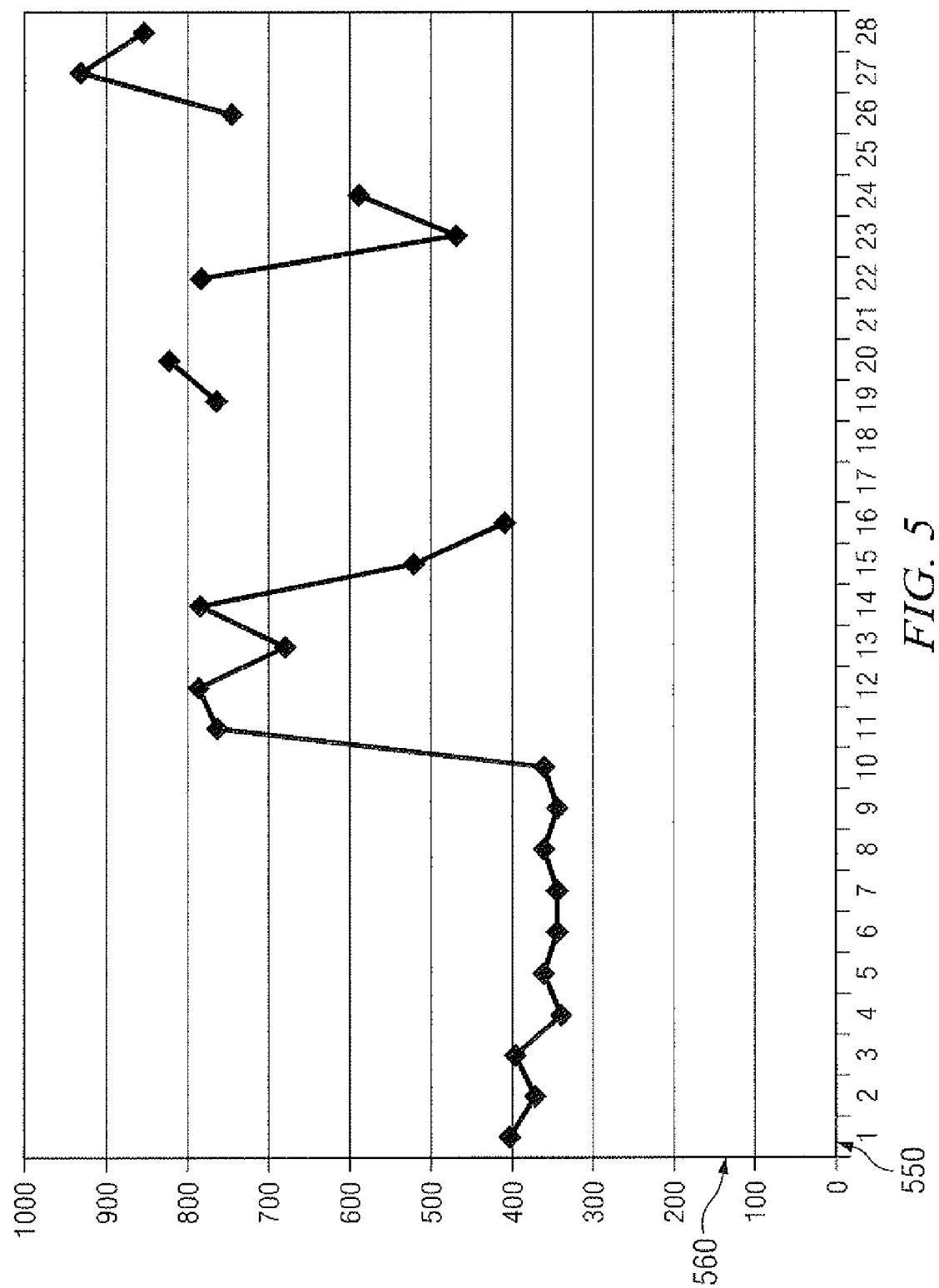
FIG. 5 is a graph showing the average frequency of the melody depicted in FIG. 4.

FIG. 5 is a graph depicting the average frequency of the notes per second corresponding to the melody of the auditory phrase denoted in FIG. 4. Referring to FIG. 5, the horizontal axis 550 is marked in seconds of elapsed time from the beginning of the auditory phrase. The vertical axis 560 is labeled in frequency and hertz. The plots shown on FIG. 5 represent the average frequency of the notes played at a given second during the performance of the auditory phrase of FIG. 4. Of note in this example, when the heat burn sensation starts at around the 14 to 15 second mark, there is a distinct change in average frequency of the music when the musical representation of the heat feeling (a trigeminal effect) appears on the graph.

To accomplish the objectives of Applicant's invention, the auditory phrase must be composed as an artistic interpretation of the flavor note sequence of the food product. This necessarily requires the person composing such auditory phrase to first sample the food product in order to make an assessment of the flavor note sequence involved. After this assessment is made, the auditory phrase can be composed by the person tasting the food product by means known in the art. The person composing the auditory phrase can be, in one embodiment, a professional musician and/or composer. Alternatively, the auditory phrase can be composed by an amateur. Sharing the auditory phrases composed for specific products with the general public enhances the tasting experience for the food product involved.

Figure 6B:
FIGS. 6a and 6b are flow charts of one embodiment of the invention.
Figure 6A:
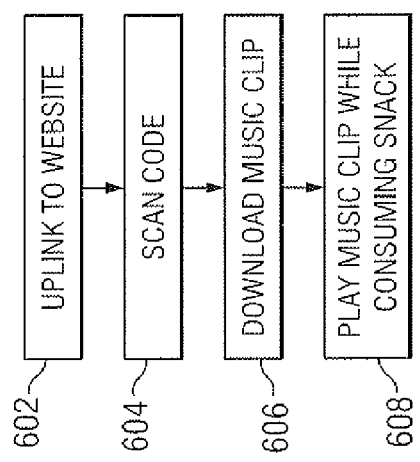

FIGS. 6a and 6b show flow charts reflecting one embodiment of the invention. Snack foods, such as potato chips, tortilla chips, corn chips, and other baked and fried savory snacks, are typically marketed in packages referred to as pillow bags. These pillow bags are made by vertical form, fill, and seal machines and provide both an environmental barrier for the product contained therein and a graphics carrier for the graphics that relate to the product contained therein. Along with the graphics, every container, such as a pillow bag, has a bar code imprinted on it that is unique to the item to be sold.

Referring to FIG. 6a, a consumer can uplink 602 via a device to a website known to the consumer to have music clips related to food products sold by the company marketing the particular food product. Examples of this device include a cell phone, a personal digital assistant ("PDA"), or a computer. The website can be identified, for example, by a string of characters imprinted with the graphics on the pillow bag container. Once the website has been accessed, the bar code of the product can be scanned 604 using methods known in the art in order to immediately associate the device with the particular files maintained by a database accessible from the website which contains music clips associated with the specific product contained in the pillow bag. In one embodiment, this involves scanning the bar code on the pillow bag with a cell phone that has been linked to a website operated by the manufacturer or marketer of the food product. One or more music clips can then be downloaded 606 to the device. The device can then be played 608 concurrent with the act of consuming the food product found within the pillow bag.

FIG. 6a shows how the consumer can use indicia from the package to direct the device to access an electronic database related to the food product. As previously mentioned, this database can contain a music clip, composed to artistically match the tasting experience of a specific product, that can be downloaded 606 and played 608 concurrent with consuming the food product, thereby matching the auditory phrase of the music clip with the sequence of flavor notes of the food product as perceived by the consumer. This electronic database can also contain video clips that provide a visual sequencing of images corresponding to the flavor notes sequencing. Consequently, the downloading step 606 can involve downloading a video clip to be associated with the consumption of said food product. In one embodiment, this video clip consists of an audio track associated with the video clip, such that the audio track (auditory phrase) and video clip can be experienced simultaneously with the consumption of the food product.

Another aspect of Applicant's invention is allowing consumers of the product to compose their own auditory phrases that, based on their artistic interpretation, best match the tasting experience of eating the food product. Referring to FIG. 6b, a consumer first consumes 610 the snack in order to experience the sequenced flavor notes. The consumer then composes a music clip 612 to relate to this flavor experience. The consumer then uplinks to the website 602 and deposits 614 the composed music clip such that it is now included in the database that is available for others to download, as previously discussed with regard to FIG. 6a. It can be seen from this example that it is not necessary for one practicing Applicant's claimed invention to compose the auditory phrase, for one can merely collect or compile one or more auditory phrase in the database.

In the previous example of a preferred embodiment, a bar code is identified as the indicia used to identify the product that will be linked with the auditory phrase. Other indicia can include a string of letters and/or numbers or a written phrase, for example. This alternative indicia can be entered into the device, such as a cell phone, PDA, or computer, to gain access to the database containing the desired music files or clips.

While this invention has been particularly shown and described with reference to a preferred embodiment, it will be understood by those skilled in the art that various changes in form and detail may be made therein without departing from the spirit and scope of the invention.

What is claimed is:

1. A method for linking tasting a food product with an auditory phrase, said method comprising the steps of:
   a) developing a food product having a plurality of flavor notes varying in intensity, duration, and initial perception, whereby a sequence of flavor notes are perceived upon tasting said food product, wherein said food product is marketed in a package, said package containing an indicia of a product identification unique to the food product;
   b) compiling an auditory phrase having a plurality of components, wherein at least one component is associated with each of the flavor notes of step a);
   c) accessing an electronic database related to the food product using a device that scans said indicia; and
   d) playing said auditory phrase on said device in conjunction with the tasting of said food product, whereby the playing of said phrase is initiated at approximately the same time that the food product is initially tasted, thereby matching the auditory phrase with the sequence of flavor notes of the food product.

2. The method of claim 1 wherein said indicia consists of a bar code.

3. The method of claim 1 wherein said device is a cell phone.

4. The method of claim 1 wherein said device is a PDA.

5. The method of claim 1 wherein said device is a computer.

6. The method of claim 1 wherein said electronic database provides for download of at least one music clip associated with said food product.

7. The method of claim 6 wherein said music clip of claim 6 is the auditory phrase played concurrently with tasting the food product.

8. The method of claim 6 wherein said database further provides for the download of at least one video clip associated with said food product.

9. The method of claim 8 wherein said video clip consists of an audio track associated with the video clip.

10. The method of claim 1 wherein said auditory phrase comprises a plurality of musical notes.

11. The method of claim 1 wherein said auditory phrase is between 5 seconds and 60 seconds in length.

12. A method for combining a tasting and listening experience, said method comprising the steps of:
   a) obtaining a food product having a flavor note sequence upon tasting, said food product marketed in a package wherein said package contains an indicia of a product identification;
   b) compiling an auditory phrase having a plurality of components, wherein at least one component is associated with each flavor note of the flavor note sequence of step a);
   c) accessing the auditory phrase using a device that scans said indicia, said auditory phrase comprising an artistic musical interpretation of the flavor note sequence of step a); and
   d) tasting said food product concurrently with listening to said auditory phrase.

13. The method of claim 12 wherein said indicia consists of a bar code.

14. The method of claim 12 wherein a consumer uses said indicia to direct the device to access an electronic database related to the food product.

15. The method of claim 14 wherein said device is a cell phone.

16. The method of claim 14 wherein said device is a PDA.

17. The method of claim 14 wherein said device is a computer.

18. The method of claim 14 wherein said electronic database provides for download of at least one music clip associated with said food product.

19. The method of claim 18 wherein said database further provides for the download of at least one video clip associated with said food product.

20. The method of claim 19 wherein said music clip consists of an audio track associated with the video clip.

21. The method of claim 12 wherein said auditory phrase comprises a plurality of musical notes.

22. The method of claim 12 wherein said auditory phrase is between 5 seconds and 60 seconds in length.

* * * * *